United States Patent [19]
Hallerback

[11] 3,866,071
[45] Feb. 11, 1975

[54] ELECTRIC MACHINES

[75] Inventor: Stig Lennart Hallerback, Vastra Frolunda, Sweden

[73] Assignee: SKF Industrial Trading and Development Company N.V., Amsterdam, Netherlands

[22] Filed: Oct. 31, 1973

[21] Appl. No.: 411,433

Related U.S. Application Data

[63] Continuation of Ser. No. 254,186, May 17, 1972.

[30] Foreign Application Priority Data
May 18, 1971    Sweden .............................. 6445/71

[52] U.S. Cl...................... 310/43, 310/90, 310/218
[51] Int. Cl. ............................................ H02k 1/04
[58] Field of Search ............. 310/179, 180, 172, 42, 310/43, 45, 218, 89, 90, 216, 91, 258, 259, 254; 264/272; 308/238, 241

[56]    References Cited
UNITED STATES PATENTS
2,668,925    2/1954    Bloser ................................ 310/258
2,827,583    3/1958    Hoddy ............................... 310/172
2,961,556    11/1960  Vance ................................ 310/258
3,030,528    4/1962    DeJean ............................... 310/45
3,042,820    7/1962    Diamond ............................ 310/43
3,122,667    2/1964    Bacin ................................. 310/45
3,378,709    4/1968    Royer ................................ 310/43
3,388,459    6/1968    Dochterman ........................ 310/42
3,546,504    12/1970  Janssen .............................. 310/43
3,694,904    10/1972  Hallerback .......................... 310/43
3,766,416    10/1973  Papst ................................. 310/43

*Primary Examiner*—R. H. Skudy
*Attorney, Agent, or Firm*—Howson & Howson

[57]    ABSTRACT

The invention relates to electric rotary machines, particularly to shaded-pole motors. It provides a stator structure with bearing supports in accurate alignment with the rotor accomodation recess.

4 Claims, 10 Drawing Figures

PATENTED FEB 1 1 1975 3,866,071

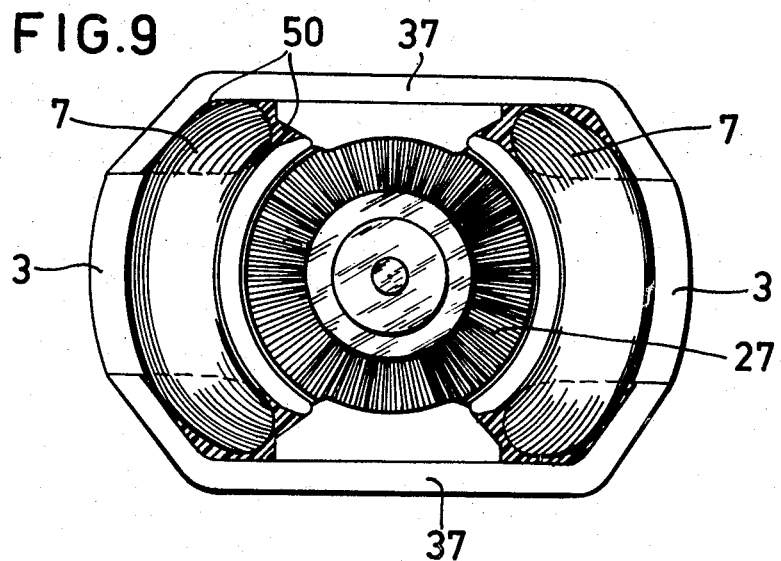

ELECTRIC MACHINES

This is a continuation, of application Ser. No. 254,186 filed May 17, 1972.

This invention relates to electric machines with rotor and stator provided with separately wound poles and conductors for the magnetic flux between the poles as well as cup-shaped bearing support means secured by the big end thereof to the stator and supporting at the small end a rotor bearing.

In an ordinary motor with a power output of less than 1 kW, at nominal voltage about 50 to 80 percent of the excitation current is consumed to produce the magnetic flux between stator and rotor whereas the rest of the current is used to magnetize the iron. The no-load current accordingly is usually rather high compared with the nominal operation current. This is especially the case in 2-pole motors wherein the efficiency is very low. In such 2-pole motors, so-called shaded-pole motors, an extra, short-circuited winding is provided at the air gap in order to obtain a starting torque, however at the cost of the efficiency which is so low that the usefulness is very limited. Thus, the output power in conventional shaded-pole motors is limited to 20 W, at most.

For that reason it is obviously desirable to narrow the air gap between rotor and stator in order to reduce the air gap loss from 80 percent to that order of magnitude, 40 to 50 percent, which is accepted in larger motors. In this way it would be possible to attain an efficiency of the same order of magnitude as in larger machines.

By reason of the structural design of conventional motors with separately wound poles, whereby a rotor accommodation recess with the desired configuration as well as an alignment, satisfactory from the tolerance and stability point of view, of the rotor in respect to the rotor recess, cannot be obtained, it is, however, not possible to increase the efficiency in any degree worth mentioning.

According to the invention the poles of the electric machine are provided with formations of setting lacquer, insulating compound or the like, which have been formed to accurate, circular guiding surfaces for the bearing support at the radially inner end surface portions of the poles.

The motor design according to the invention reduces the air gap dependent part of the excitation current and at the same time makes it possible to use other design arrangements to improve efficiency which can moreover be carried out at a lower cost than by conventional construction.

The invention will now be described more in detail with reference to the drawings of which FIGS. 1-3 illustrate the above-described state of the art;

FIG. 10 is a perspective view of a 2-pole motor designed according to the invention.

Figure 1:
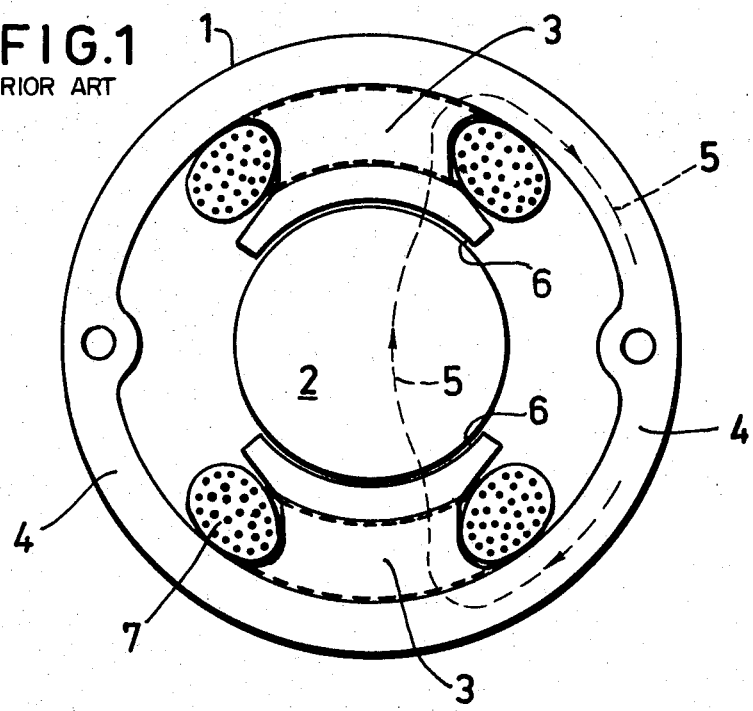

FIG. 1 shows in principle the path of the magnetic flux through a 2-pole motor comprising a stator 1 and a rotor 2. The poles 3 are interconnected by a yoke portion 4. The magnetic flux 5 passes through the poles and yoke portion as shown by the flux arrow 5, and thereby iron losses occur. The dominating air gap loss (about 80 percent) occurs when the flux passes the air gap 6. In FIG. 1 the stator winding is denoted 7. In order to obtain a homogeneous magnetic flux, the air gap 6 must be extremely uniform, both circumferentially and axially along the rotor. By conventional motor construction the desirable result cannot be attained, which will be clear from the following description of FIG. 2.

Figure 2:
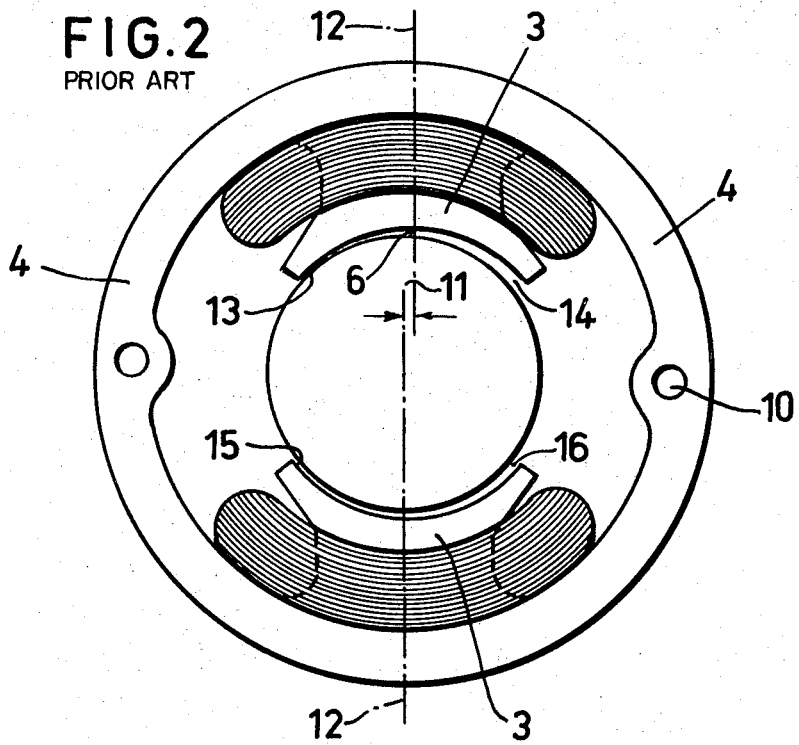

FIG. 2 shows diagrammatically a section of the motor in FIG. 1, and emphasizes the dimensional errors, which always occur by conventional manufacturing. The stator laminations are formed of two relatively rigid poles 3, interconnected by the yoke portions 4. The latter are extremely weak and are as well usually pierced by fastening holes 10 for bearing brackets and the like. Already when punching out stator laminations the shape of the latter will become deformed due to several factors, such as the hardness variations of the plate, the lamination direction, tool tolerances and wear, as well as the handling of the plates and their assembly. The flexible yoke portions, in addition further weakened by the holes 10, easily permit displacements 11 of the poles from their common center line 12. Owing to this there will be great distortion in the configuration of the air gap 6. By one and the same pole (the poles have particularly great peripherical lengths) one pole flank 13 thus may have a minimal clearance (<0,1 mm), while the other pole flank 14 has a several times greater clearance (>0,8 mm). Consequently there will be a very deformed magnetic flux with a strong flux by 13 and a very weak flux by 14. In addition, the opposite pole may be displaced from the center, radially or obliquely outwards, so that the air gaps 14 and 16 will have completely different characteristics. Besides, by conventional motor assembling there will always be air gap errors axially along the rotor. Thus it is quite obvious that this type of motor cannot be used for high powers, because of the domination of the thermal and economic losses.

The manner which is used in conventional motor assembly to fasten the bearing bracket or the bearing shield to the weak yoke portions 4 entails still further risks of a thoroughly faulty rotor mounting. In addition, the conventional bearing bracket is from structural point of view such, that bendings and movements will easily occur, and at the same time the fastening means, usually screws and nuts, by the yoke part 10 are conducive to producing dimensional faults and shape distortions. It is desirable that the bearing bracket is equally rigid in all directions, otherwise accentuated vibrations will easily appear.

By providing a motor structure according to the invention, described below, practically all the problems mentioned above are solved. The air gap can be reduced to only a few hundredths of a millimeter, and at the same time the tolerances both circumferentially and axially can be made very close. The weak and thin yoke portions are employed only for closing the flux circuit and not as supporting means for the rotor bearings. As a result of this design the no-load current will be reduced by about 50 percent.

Figure 3:
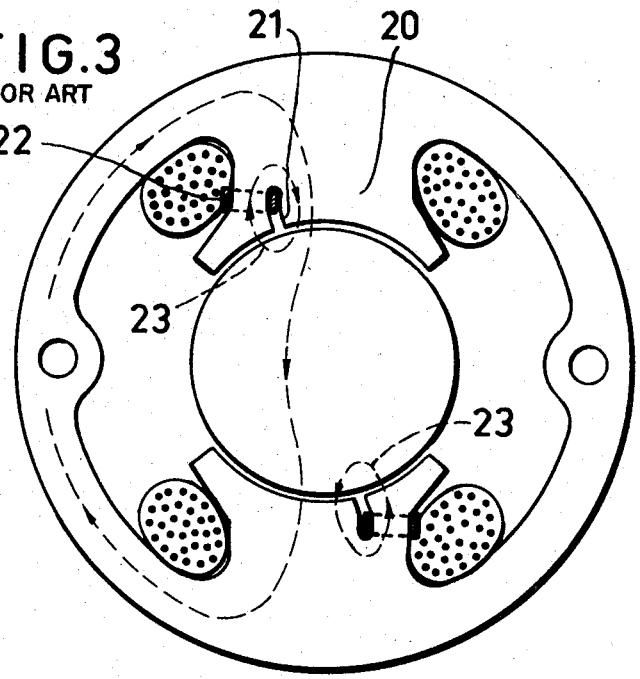

FIG. 3 shows diagrammatically a section of a shaded-pole motor. The both main poles 20 are at one flank formed with a recess 21, in which a short-circuited copper loop 22 is accommodated. This loop produces by way of induction a separate magnetic flux 23, which produces a starting and rotational torque for the rotor. This additional magnetic flux is of course, at the same time as it produces a torque, a heavily efficiency-reducing factor in operation. The air gap configurations described with reference to FIGS. 1 and 2 have an important influence on a motor of this type, because a narrowing of the air gap at the pole portion outside the recess produces a strongly increased starting torque, while at the same time the flux by the other flank of the main pole portion decreases. The increased auxiliary flux during the start will be heavily efficiency-reducing in operation.

In the opening part of this specification it has been pointed out that the iron losses in motors of the above mentioned kind are between 20 and 50 percent of the excitation current. The iron losses could be reduced if "flux-oriented" laminations could be used in the poles of the stator lamination assembly and the yoke parts. Such a flux-oriented lamination has a $\mu$-value of about 20.000 compared with conventional dynamo plates which have a $\mu$-value between 2,000 and 3,000. If one attempts to use flux-oriented laminations in conventional 2-pole motors, some stator portions will, however, have a wrong flux direction, which has a negative influence on the technical result. At the same time it must be kept in mind that this plate is more expensive than the conventional. Furthermore, the scrap proportion is usually very high. By adopting the invention which is described below one can advantageously use flux-oriented laminations, whereby a 20 percent improvement of the no-load current can be obtained in respect to the plate losses. In addition, the stator can be built in such a way that a very small scrap proportion is obtained, namely 10–20 percent compared to the usual 50 percent.

Figure 4:
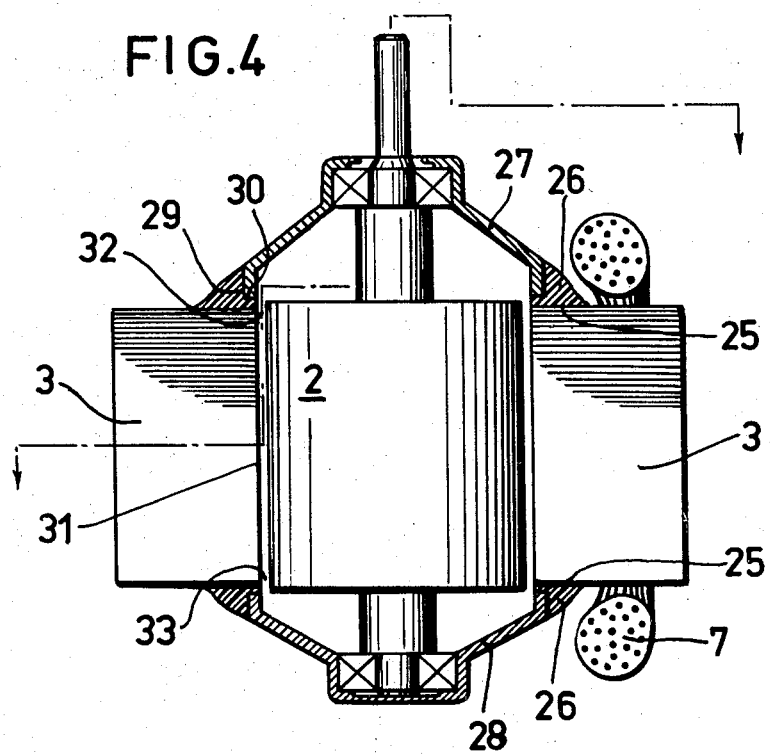
FIG. 4 is a longitudinal section view.
Figure 5:
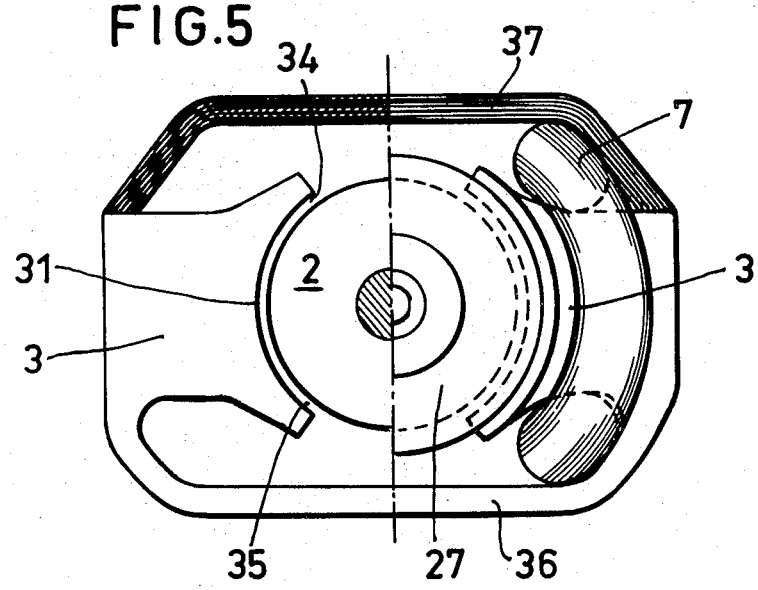
FIG. 5 is an end view partly in cross section of a 2-pole motor according to the invention.

FIG. 4 shows a longitudinal section and FIG. 5 an end view and partly cross section of a 2-pole motor according to the invention. The magnet poles 3 are provided at their end surfaces 25 with molded plastic formations 26, which are formed to aligning and fastening members for the bearing supports 27 and 28 which are interconnecting the magnet poles 3. These bearing supports form bearing units for the rotor 2. Before the rotor is put in position, the plastic formations 26 have been molded on with the aid of mandrel means, to provide extremely accurate guiding surfaces 29 and abutment surfaces 30 in relation to the inner, cylindrical circumferential surface 31 of the magnet poles facing the rotor 2. The molding-on of the plastic bodies 26 is made in such a manner that the yoke portions of the stator laminations do not have any influence on the alignment and guiding surfaces in relation to the rotor accommodation recess, irrespective of whether the yoke portions are punched integrally with the poles or separately from these. When the magnet poles 3 are joined by means of the bearing supports 27 and 28, there is obtained a unit having an alignment and central positioning of the rotor 2 such as to cause extremely small divergences in the air gap between the magnet poles 3 and the rotor 2 both in the axial direction, 32 resp. 33, and peripherally, 34 resp. 35. Thanks to this the air gap can be reduced to a minimum, and by this means the gap losses are very much cut down. Thus, the homogenity and uniformity of the magnetic flux is maintained, and at the same time there is produced a motor with a higher power output and reduced losses.

FIG. 5 shows in the lower part how the yoke portion 36 of the stator has been punched out directly in the stator lamination, while FIG. 5 in the upper part shows a separately manufactured stator yoke 37. At the molding-on of the plastic formation in the first case the poles 3 have been radially urged against the mandrel means, whereby the mechanically weak yoke part 36 has conformed therewith to the necessary extent. At the final assembling with bearing supports the poles will again assume the position which they had by the molding-on of the bodies 26. In addition, by this assembly the bearing supports and their fixation must be so resistant that the stresses due to forced minor deformations in the yoke portion do not have a prejudicial influence upon the accuracy of the shape of the bearing supports or their fitting.

With a separately punched yoke portion 37, it is possible to apply the field winding 7 from outside and thus to reduce the dimensions of the motor. At the same time the field winding can be closely adapted to the pole dimensions, whereby the quantity of copper can be reduced. This is true irrespective of the number of poles. In 4-pole motors, for example, the dimension reduction can be still greater.

Figure 6:
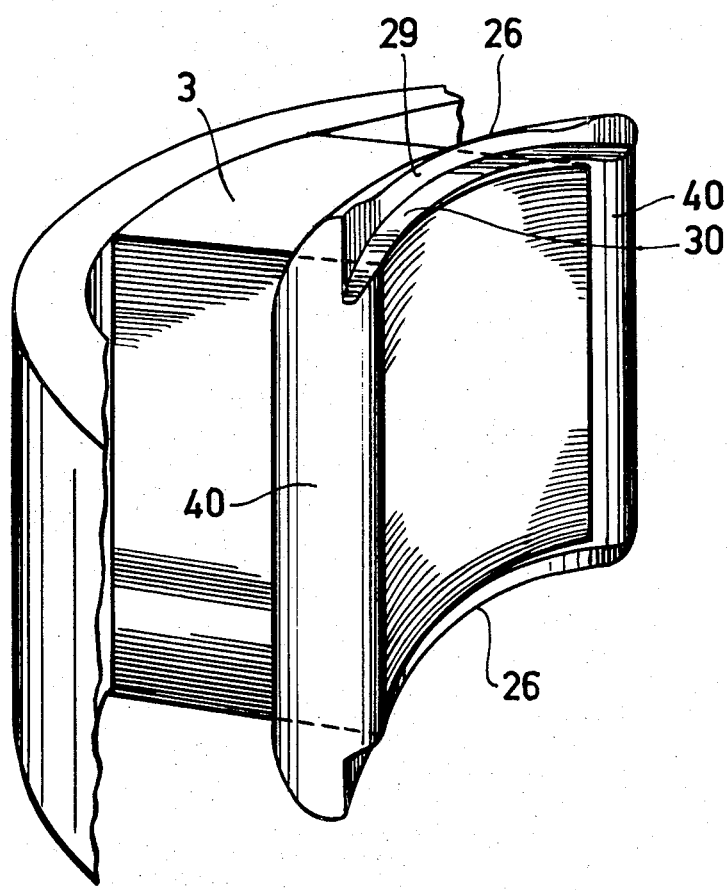
FIG. 6 is a perspective view of a magnet pole with molded-on plastic formations.

FIG. 6 shows a partial view of an electric motor wherein the magnet pole 3 by means of a molding operation has been provided with plastic formations 26 and bodies 40 which interconnect the formations 26. The latter have abutment surfaces 30 and aligning surfaces 29, while the bodies 40 are provided to interconnect the laminations of the magnet pole and to guide the field winding.

Figure 7:
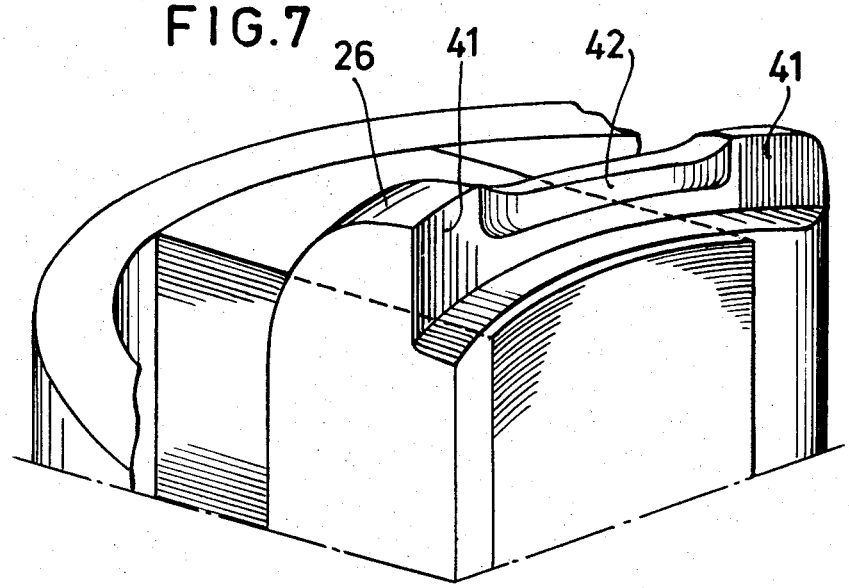
FIG. 7 shows a detail of such a plastic formation, designed to be put into and bonded to the bearing support.

FIG. 7 shows a partial view of the molded plastic formation 26, the circular alignment surface of the latter being formed with sealing surfaces 41 at the flanks. The purpose of these sealing surfaces is to prevent glue or molding compound to penetrate into the rotor recess from the molding surface 42 when the bearing support is fixed as by bonding.

Figure 8:
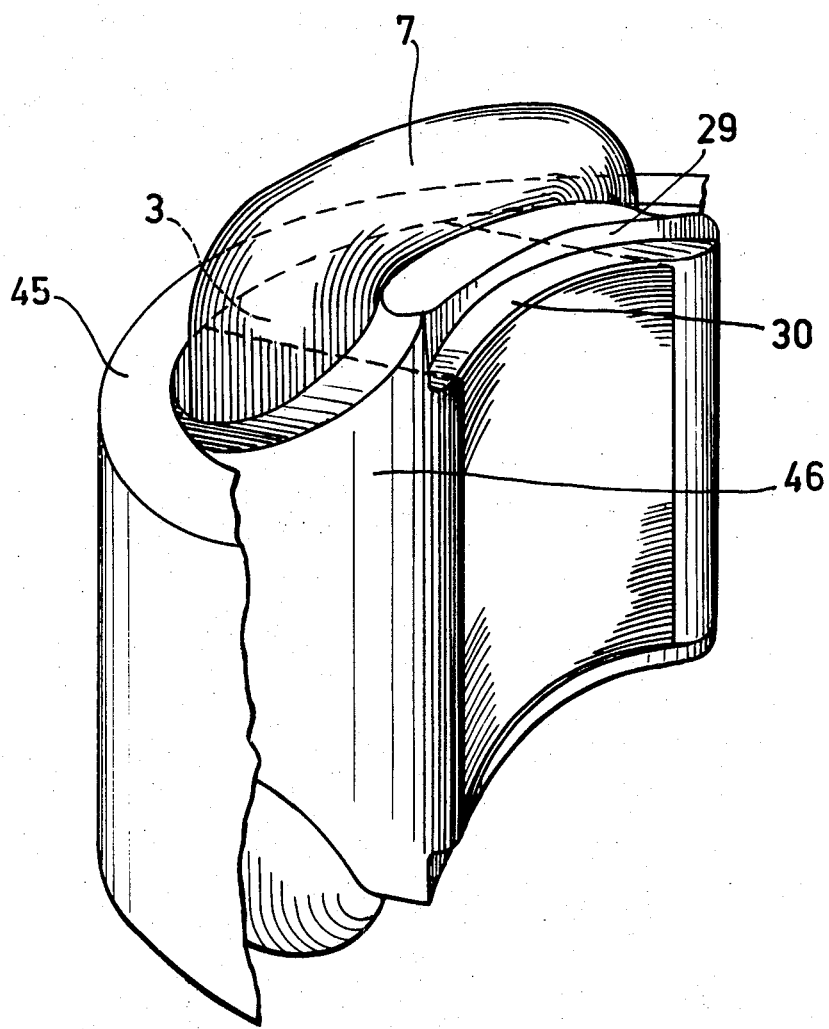
FIG. 8 shows how the plastic formations are brought to enclose the magnet pole winding, as well, and thus also will constitute structural connecting members for the stator yoke which is further illustrated by FIG. 9.

FIG. 8 is a partial perspective view of a magnet pole 3 provided with a field winding 7 and a supporting stator yoke 45. These components have been molded together by means of lacquer or molding compound 46, so that they form a rigid unit with aligning and abutment surfaces 29 and 30 which are required for fastening the bearing supports.

FIG. 9 is an end view of a motor in which the poles 3, the stator yoke 37 and the windings 7 have been molded together with the bearing supports 27 by means of plastic or lacquer mass 50.

What is claimed is:

1. An electric machine comprising a stator assembly and a rotor supported for rotation interiorly of the stator assembly, said stator assembly including a relatively yielding stator yoke, at least a pair of radially inwardly extending poles having an arcuate configuration at the inner end faces to define a rotor recess conforming to the contour of the rotor to provide a small air gap therebetween, cup-shaped bearing support means adjacent opposite axial ends of the stator assembly and a molding member consisting of a hardening compound for supporting the poles and being formed with arcuate guide surfaces at opposite axial ends for the cup-shaped bearing support means thereby to support the rotor coaxially with respect to the rotor recess defined by the inner faces of the poles, said molding member circumscribing the poles adjacent the radially inner end faces thereof and having arcuate portions at opposite axial ends of the poles of a predetermined configuration defining transversely oriented abutment and aligning faces for said bearing support means, said molding member having portions connecting the arcuate guide portions at opposite ends operable to provide means for interconnecting the laminations of the poles and to guide said field windings.

2. An electric machine according to claim 1, characterized in that the formations of the molding member surround the lateral surfaces of the poles.

3. An electric machine according to claim 1, characterized in that the field winding closely surrounds the pole body.

4. An electric machine according to claim 1, characterized in that the space between the pole body flanks at the rotor accommodation recess and radially, circumferentially juxtaposed stator part is considerably smaller than the transverse dimension of the field winding.

* * * * *